US008445162B2

(12) United States Patent
Alexandrovichserov et al.

(10) Patent No.: US 8,445,162 B2
(45) Date of Patent: May 21, 2013

(54) CATHODE CATALYST FOR FUEL CELL AND MEMBRANE-ELECTRODE ASSEMBLY FOR FUEL CELL AND FUEL CELL SYSTEM INCLUDING SAME

(75) Inventors: Alexey Alexandrovichserov, Suwon-si (KR); Chan Kwak, Suwon-si (KR); Si-Hyun Lee, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1796 days.

(21) Appl. No.: 11/723,198

(22) Filed: Mar. 16, 2007

(65) Prior Publication Data

US 2007/0238009 A1    Oct. 11, 2007

(30) Foreign Application Priority Data

Mar. 16, 2006    (KR) .................. 10-2006-0024391

(51) Int. Cl.
*H01M 4/02* (2006.01)
*H01M 8/10* (2006.01)
*B01J 23/40* (2006.01)

(52) U.S. Cl.
USPC ............ 429/532; 429/483; 429/492; 502/261

(58) Field of Classification Search
None
See application file for complete search history.

(56) References Cited

U.S. PATENT DOCUMENTS

2005/0287414 A1* 12/2005 Noh .................. 429/36
2010/0004121 A1    1/2010 Chang et al.

FOREIGN PATENT DOCUMENTS

| CN | 1697222 | 11/2005 |
|---|---|---|
| EP | 1 553 052 | 11/2004 |
| JP | 2005-129358 | 5/2005 |
| JP | 2005-194184 | 7/2005 |
| KR | 10-2005-0046102 | 5/2005 |
| KR | 10-0520439 | 5/2005 |
| KR | 10-2005-0112375 | 11/2005 |

OTHER PUBLICATIONS

Definition of "Electronic" retrieved from Dictionary.com on Jul. 9, 2010.*
"*Air-Stable Monodispersed $MO_6S_3I_6$ Nanowires*" Vrbanić, et al., Nanotechnology, vol. 15, 635-638 (Mar. 9, 2004).
Search Report from the European Patent Office issued in Applicant's corresponding European Patent Application No. 07104307.9 dated Aug. 28, 2008.
Vrbanic, et at., "Mo6S3I6 nanowires", XP-002379261, Jan. 1, 2004.
Nicolosi, et al., "Solubility of Mo6S4.5I4.5 nanowires", XP004686120, Jan. 1, 2005.

(Continued)

*Primary Examiner* — Ula C Ruddock
*Assistant Examiner* — Matthew Van Oudenaren
(74) *Attorney, Agent, or Firm* — Robert E. Bushnell, Esq.

(57) ABSTRACT

A cathode catalyst includes a carrier including Mo, S, and I, and an active metal supported on the carrier and including a material selected from the group consisting of Ru, Pt, Rh, and combinations thereof. It is shown that such a catalyst for a cathode has improved activity over platinum catalysts.

26 Claims, 2 Drawing Sheets

OTHER PUBLICATIONS

Japanese Office Action issued on Oct. 5, 2010 in the corresponding Japanese Patent Application No. 2007-065371 and Request for Entry of the Accompanying Document herewith.

Vrbanic D et al., Mo6S3I6 nanowires, AIP Conference Proceedings—Electronic Properties of Synthetic Nanostructures- , US, American Institute of Physics, 2004, vol. 723, 423-426.

Nicolosi et al., Solubility of Mo6S4. 5 I4.5 nanowires, Chemical Physics Letters, Elsevier, Nov. 23, 2004, 401, 13-18.

European Office Action issued by European Patent Office, dated Jan. 24, 2011, corresponding to European Patent Application No. 07 104 307.9-1227.

European Office action issued by European Patent Office on Jan. 18, 2012, corresponding to EP Application No. 07 104 307 9-1227 attached herewith.

\* cited by examiner

CATHODE CATALYST FOR FUEL CELL AND MEMBRANE-ELECTRODE ASSEMBLY FOR FUEL CELL AND FUEL CELL SYSTEM INCLUDING SAME

CLAIM OF PRIORITY

This application makes reference to, incorporates the same herein, and claims all benefits accruing under 35 U.S.C. §119 from an application for CATHODE CATALYSTFOR FUEL CELL AND MEMBRANE-ELECTRODE ASSEMBLY FOR FUEL CELL AND FUEL CELL SYSTEM INCLUDING SAME earlier filed in the Korean Intellectual Property Office on 16 Mar. 2006 and there duly assigned Serial No. 10-2006-0024391.

BACKGROUND OF THE INVENTION

1. Field of the Invention

The present invention relates to a cathode catalyst for a fuel cell, and a membrane-electrode assembly for a fuel cell and fuel cell system including the same. More particularly, the present invention relates to a cathode catalyst having high activity for reduction of an oxidant and selectivity, and that is capable of improving performance of a membrane-electrode assembly for a fuel cell, and a fuel cell system including the same.

2. Description of the Related Art

A fuel cell is a power generation system for producing electrical energy through an electrochemical redox reaction of an oxidant and hydrogen in a hydrocarbon-based material such as methanol, ethanol, or natural gas. Representative exemplary fuel cells include a polymer electrolyte membrane fuel cell (PEMFC) and a direct oxidation fuel cell (DOFC). The direct oxidation fuel cell includes a direct methanol fuel cell that uses methanol as a fuel.

The polymer electrolyte fuel cell has an advantage of a high energy density, but it also has problems in the need to carefully handle hydrogen gas and the requirement of accessory facilities, such as a fuel reforming processor for reforming methane or methanol, natural gas, and the like, in order to produce hydrogen as the fuel gas.

On the contrary, a direct oxidation fuel cell has a lower energy density than that of the polymer electrolyte fuel cell, but it has the advantages of easy handling of a fuel, being capable of operating at room temperature due to its low operation temperature, and no need for additional fuel reforming processors.

In the above fuel cell, the stack that generates electricity substantially includes several to scores of unit cells stacked in multi-layers, and each unit cell is formed of a membrane-electrode assembly (MEA) and a separator (also referred to as a bipolar plate). The membrane-electrode assembly has an anode (also referred to as a fuel electrode or an oxidation electrode) and a cathode (also referred to as an air electrode or a reduction electrode) attached to each other with an electrolyte membrane between them.

A fuel cell is a power generation system for generating electrical energy through oxidation of a fuel and reduction of an oxidant. The oxidation of a fuel occurs at an anode, while the reduction of an oxidant occurs at a cathode.

Both of the anode and the cathode include a catalyst layer that includes a catalyst to increase the oxidation of a fuel and the reduction of an oxidant. The catalyst for the anode catalyst layer representatively includes platinum-ruthenium, while that for the cathode catalyst layer may include platinum.

However, the platinum as a cathode catalyst has a problem of low reduction of an oxidant. It can also be depolarized by a fuel that crosses over toward a cathode through an electrolyte membrane, thereby becoming non-activated in a direct oxidation fuel cell. Therefore, what is needed is an improved catalyst for the cathode of the fuel cell that can be substituted for the platinum.

SUMMARY OF THE INVENTION

One embodiment of the present invention provides a cathode catalyst for a fuel cell that has excellent activity and selectivity for reduction of an oxidant. Another embodiment of the present invention provides a membrane-electrode assembly for a fuel cell including the cathode catalyst.

According to one embodiment of the present invention, a cathode catalyst for a fuel cell is provided, which includes a carrier comprising Mo, S, and I and an active metal supported on the carrier, the active metal being selected from the group consisting of Ru, Pt, Rh, and combinations thereof. The carrier can be $Mo_6S_{9-x}I_x$, wherein $1 \leq x \leq 7$. X can satisfy $3 \leq x \leq 6$. X can satisfy $4.5 \leq x \leq 6$. The carrier can be selected from the group consisting of nanowire, nanotubes, and a mixture thereof. The carrier can be a nanowire. The nanowire can have a diameter ranging from 20 to 40 µm. The nanowire can have a diameter ranging from 20 to 30 nm. The nanowire can have a length ranging from 100 to 400 µm. The nanowire can have a length ranging from 200 to 350 µm.

According to another embodiment of the present invention, a membrane-electrode assembly that includes an anode and a cathode facing each other and a polymer electrolyte membrane arranged between the anode and the cathode, wherein the cathode comprises a carrier comprising Mo, S, and I, and an active metal supported on the carrier, the active metal being selected from the group consisting of Ru, Pt, Rh, and combinations thereof. The carrier can be $Mo_6S_{9-x}I_x$, wherein $1 \leq x \leq 7$. The carrier can selected from the group consisting of nanowire, nanotubes, and a mixture thereof. The nanowire can have a diameter ranging from 20 to 40 nm. The nanowire can have a length ranging from 100 to 400 µm. The polymer electrolyte membrane can include a polymer resin having a cation exchange group selected from the group consisting of a sulfonic acid group, a carboxylic acid group, a phosphoric acid group, a phosphonic acid group, and derivatives thereof at its side chain. The polymer resin can be selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, polyphenylquinoxaline-based polymers, and combinations thereof. The anode can include at least one material selected from the group consisting of platinum, ruthenium, osmium, a platinum-ruthenium alloy, a platinum-osmium alloy, a platinum-palladium alloy, a platinum-M alloy (M is a transition element selected from the group consisting of Ga, Ti, V, Cr, Mn, Fe, Co, Ni, Cu, Zn, Sn, Mo, W, Rh, Ru, and combinations thereof), and combinations thereof.

According to yet another embodiment of the present invention, a fuel cell system is provided, which includes a fuel supplier, an oxidant supplier and at least one electricity generating element comprising a membrane-electrode assembly and separators arranged on each side of the membrane-electrode assembly, the membrane-electrode assembly including a cathode, an anode, and a polymer electrolyte membrane arranged between the cathode and the anode, wherein the cathode comprises a carrier including Mo, S, and I, and an active metal supported on the carrier, the active metal being selected from the group consisting of Ru, Pt, Rh, and combinations thereof. The carrier can be $Mo_6S_{9-x}I_x$, wherein $1 \leq x \leq 7$. The carrier can selected from the group consisting of nanowire, nanotubes, and a mixture thereof. The nanowire can have a diameter ranging from 20 to 40 nm. The nanowire can have a length ranging from 100 to 400 μm. The polymer electrolyte membrane can include a polymer resin having a cation exchange group selected from the group consisting of a sulfonic acid group, a carboxylic acid group, a phosphoric acid group, a phosphonic acid group, and derivatives thereof at its side chain. The polymer resin can be selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, polyphenylquinoxaline-based polymers, and combinations thereof. The anode can include at least one material selected from the group consisting of platinum, ruthenium, osmium, a platinum-ruthenium alloy, a platinum-osmium alloy, a platinum-palladium alloy, a platinum-M alloy (M is a transition element selected from the group consisting of Ga, Ti, V, Cr, Mn, Fe, Co, Ni, Cu, Zn, Sn, Mo, W, Rh, Ru, and combinations thereof), and combinations thereof.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
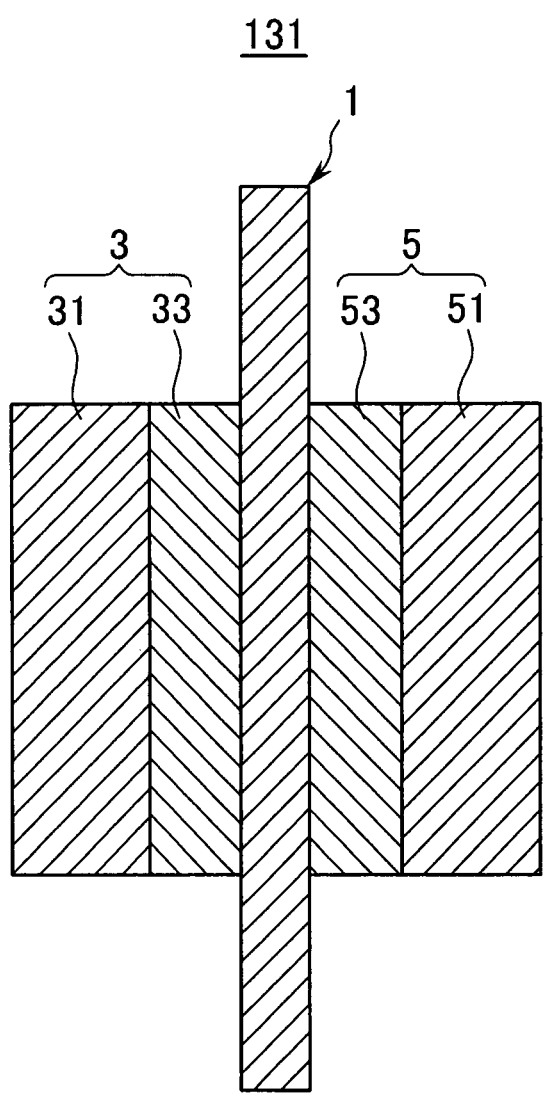
FIG. 1 is a schematic cross-sectional view showing a membrane-electrode assembly according to an embodiment of the present invention.

The cathode catalyst of the present invention has excellent activity and selectivity for reduction of an oxidant, and is inactivated by fuel crossover to a cathode. The cathode catalyst includes a carrier including Mo, S, and I, and an active metal selected from the group consisting of Ru, Pt, Rh, and combinations thereof and supported on the carrier. The carrier can be $Mo_6S_{9-x}I_x$, where $1 \leq x \leq 7$.

The active metal of a platinum-based element of Pt, Ru, or Rh has high activity for a reduction reaction of an oxidant. Oxygen in the air is easily adsorbed and bound to Pt, Ru, or Rh and can thereby block the active center of Pt, Ru, or Rh, resulting in deterioration of an oxidant reduction and promotion of oxidation of a fuel that is subject to crossover to a cathode.

According to one embodiment of the present invention, the active metal of Pt, Ru or Rh is supported on the carrier including Mo, S, and I, and thereby the activity and selectivity of the active metal are improved. The Mo element of the carrier has high activity for a reduction reaction of an oxidant, and thereby it can improve activity of the cathode catalyst.

The S prevents oxygen from the air from binding to Pt, Ru, or Rh and thereby also improves selectivity, and I improves electroconductivity.

The carrier includes Mo, S, and I, and specifically $Mo_6S_{9-x}I_x$, where x ranges from 1 to 7. According to one embodiment, x ranges from 3 to 6, and according to another embodiment, x ranges from 4.5 to 6. The carrier has a nanowire shape, and particularly $Mo_6S_{9-x}I_x$ has mainly a nanowire shape and partially a nanotube shape.

The nanowire or nanotube has a diameter ranging from 20 to 40 nm. According to one embodiment, the nanowire or nanotube has a diameter ranging from 20 to 30 nm. When it is more than 40 nm, the specific surface area of the catalyst is low and thus catalyst activity decreases, whereas when it is less than 20 nm, active metal deposition is difficult and thus catalyst activity decreases.

The nanowire or nanotube has a length ranging from 100 to 400 μm. According to one embodiment, the nanowire or nanotube is 200 to 350 μm long. When the length is more than 400 μm, the specific surface area of the catalyst is low and thus catalyst activity decreases, whereas when it is less than 100 μm, active metal deposition is difficult and thus catalyst activity decreases.

The cathode catalyst can be prepared by supporting Pt, Ru, or Rh on a carrier including Mo, S, and I using various supporting methods. According to one embodiment, the supporting method can be performed as follows. A Pt, Ru, or Rh salt is dissolved in a solvent, and then a carrier including Mo, S, and I, particularly $Mo_6S_{9-x}I_x$ (where x is as above) is added to the resulting solution followed by agitating. The solvent can include xylene, benzene, or toluene. The Pt salt can include platinum chloric acid, platinum acetylacetonate, or platinum carbonyl; the Ru salt can include ruthenium carbonyl, ruthenium chloride, or ruthenium acetyl acetonate; and the Rh salt can include rhodium carbonyl, rhodium chloride, or rhodium acetyl acetonate. The Pt, Ru, or Rh salt and the carrier can be mixed in a weight ratio ranging from 1 to 20:4 to 1.

The carrier, particularly $Mo_6S_{9-x}I_x$, was prepared by mixing Mo, S, and I in an appropriate mole ratio, putting the mixture in a quartz ampoule, and heat treating at 200 to 350° C. for one week in a gradient furnace having two different heat-treatment regions of T1 and T2. The resulting product was obtained by sublimating in the T1 region, and then extracting in the T2 region. Herein, T1 and T2 are within the ranges 400° C.$\leq$T1$\leq$500° C. and 350° C.$\leq$T2$\leq$450° C. The agitating process is performed at 50 to 150° C. for 1 to 24 hours. The resulting product was filtrated and dried to obtain a cathode catalyst of the present invention. Herein, the drying process is performed at 70 to 120° C. for 1 to 24 hours.

The present invention also provides a membrane-electrode assembly for a fuel cell including a cathode catalyst for a fuel cell. The membrane-electrode assembly of the present invention includes an anode and a cathode facing each other and a polymer electrolyte membrane interposed therebetween. The anode and cathode include an electrode substrate formed of a conductive substrate and a catalyst layer disposed on the electrode substrate.

FIG. 1 is a schematic cross-sectional view of a membrane-electrode assembly 131 according to an embodiment of the present invention. Hereinafter, the membrane-electrode assembly 131 of the present invention is described in more detail referring to the drawing. The membrane-electrode assembly 131 generates electrical energy through oxidation of a fuel and reduction of an oxidant. One or several membrane-electrode assemblies are stacked in a stack.

An oxidant is reduced at a catalyst layer 53 of the cathode 5, which includes a cathode catalyst that includes a carrier including Mo, S, and I, and an active metal selected from the group consisting of Ru, Pt, Rh, and combinations thereof and supported on the carrier. The cathode catalyst has excellent activity as well as high selectivity for an oxidant reduction reaction. Thereby the cathode catalyst improves performance of a cathode 5 and a membrane-electrode assembly 131 including the same.

A fuel is oxidized at a catalyst layer 33 of the anode 3, which includes a catalyst that is capable of accelerating the oxidation of a fuel. The catalyst can be platinum-based as is commonly used in the conventional art. The platinum-based catalyst includes platinum, ruthenium, osmium, a platinum-ruthenium alloy, a platinum-osmium alloy, a platinum-palladium alloy, a platinum-M alloy, or combinations thereof, where M is transition elements selected from the group consisting of Ga, Ti, V, Cr, Mn, Fe, Co, Ni, Cu, Zn, Sn, Mo, W, Rh, Ru, and combinations thereof. Representative examples of the catalysts include at least one selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and combinations thereof.

Such a metal catalyst can be used in a form of a metal itself (black catalyst) or can be used with while being supported on a carrier. The carrier can include carbon such as acetylene black, denka black, activated carbon, ketjen black, or graphite, or an inorganic particulate such as alumina, silica, zirconia, or titania. The carbon is generally used in the art.

The catalyst layers 33 and 53 of the anode 3 and the cathode 5 can further include a binder resin to improve its adherence and proton transference. The binder resin can be a proton conductive polymer resin having a cation exchange group selected from the group consisting of a sulfonic acid group, a carboxylic acid group, a phosphoric acid group, a phosphonic acid group, and derivatives thereof, at its side chain. Non-limiting examples of the polymer include at least one proton conductive polymer selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), or poly(2,5-benzimidazole).

The binder resin can be used singularly or as a mixture. Optionally, the binder resin can be used along with a non-conductive polymer to improve adherence between a polymer electrolyte membrane and the catalyst layer. The use amount of the binder resin can be adjusted according to its usage purpose.

Non-limiting examples of the non-conductive polymer include polytetrafluoroethylene (PTFE), tetrafluoroethylene-hexafluoropropylene copolymers (FEP), tetrafluoroethylene-perfluoro alkyl vinylether copolymers (PFA), ethylene/tetrafluoroethylene (ETFE)), ethylenechlorotrifluoro-ethylene copolymers (ECTFE), polyvinylidene fluoride, polyvinylidene fluoride-hexafluoropropylene copolymers (PVdF-HFP), dodecyl benzene sulfonic acid, sorbitol, and combinations thereof.

Electrode substrates 31 and 51 of the anode and cathode provide a path for transferring fuel and an oxidant to the catalyst. In one embodiment, the electrode substrate is formed from a conductive material such as carbon paper, carbon cloth, or carbon felt, or a metal cloth that includes a metal film formed on a surface of porous cloth film or a cloth composed of polymer fibers. The electrode substrate is not limited thereto.

A microporous layer (MPL) can be added between the aforementioned electrode substrate and catalyst layer to increase reactant diffusion effects. The microporous layer generally includes conductive powders with a certain particle diameter. The conductive material can include, but is not limited to, carbon powder, carbon black, acetylene black, activated carbon, carbon fiber, fullerene, nano-carbon, or combinations thereof. The nano-carbon can include a material such as carbon nanotubes, carbon nanofiber, carbon nanowire, carbon nanohoms, carbon nanorings, or combinations thereof. The microporous layer is formed by coating a composition including a conductive powder, a binder resin, and a solvent on the conductive substrate. The binder resin can include, but is not limited to, polytetrafluoro ethylene, polyvinylidene fluoride, polyvinyl alcohol, cellulose acetate, polyhexafluoro propylene, polyperfluoroalkylvinyl ether, polyperfluoro sulfonylfluoride alkoxy vinyl ether, and copolymers thereof. The solvent can include, but is not limited to, an alcohol such as ethanol, isopropylalcohol, n-propylalcohol, butanol, and so on, water, dimethyl acetamide, dimethyl sulfoxide, or N-methylpyrrolidone. The coating method can include, but is not limited to, screen printing, spray coating, doctor blade methods, gravure coating, dip coating, silk screening, painting, and so on, depending on the viscosity of the composition.

The polymer electrolyte membrane 1 plays a role of exchanging ions by transferring the protons produced from the anode catalyst 33 to the cathode catalyst 53.

The proton conductive polymer for the polymer electrolyte membrane of the present invention can be any polymer resin having a cation exchange group selected from the group consisting of a sulfonic acid group, a carboxylic acid group, a phosphoric acid group, a phosphonic acid group, and derivatives thereof, at its side chain.

Non-limiting examples of the polymer resin include at least one proton conductive polymer selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), or poly(2,5-benzimidazole).

The H can be replaced with Na, K, Li, Cs, or tetrabutylammonium in a proton conductive group of the proton conductive polymer. When the H is replaced with Na in an ion exchange group at the terminal end of the proton conductive group, NaOH is used. When the H is replaced with tetrabutylammonium, tetrabutylammonium hydroxide is used. K, Li, or Cs can also be replaced by using appropriate compounds. A method of replacing H is known in this related art, and therefore is not described in detail.

The membrane-electrode assembly 131 can be applied as one constituent element of a fuel cell system such as a polymer electrolyte fuel cell (PEMFC) and a direct oxidation fuel cell. Since the catalyst of the cathode catalyst layer 53 has excellent selectivity for an oxidant reduction reaction, it can be effectively used for a direct oxidation fuel cell, especially a direct methanol fuel cell having a problem of fuel crossover.

Hereinafter, constituent elements of a fuel cell system including a membrane-electrode assembly 131 are described in more detail. The membrane-electrode assembly 131 can be used in another fuel cell system, and is not limited to a specific fuel cell system.

A fuel cell system of the present invention includes at least one electricity generating element, a fuel supplier, and an oxidant supplier. The electricity generating element includes a membrane-electrode assembly and separators positioned at both sides of the membrane-electrode assembly. The electricity generating element generates electricity through oxidation of fuel and reduction of an oxidant.

The fuel supplier plays a role of supplying the electricity generating element with a fuel including hydrogen, and the oxidant supplier plays a role of supplying the electricity generating element with an oxidant. The fuel includes liquid or gaseous hydrogen, or a hydrocarbon-based fuel such as methanol, ethanol, propanol, butanol, or natural gas. The oxidant includes oxygen or air. However, the fuel and oxidant are not limited to the above.

Figure 2:
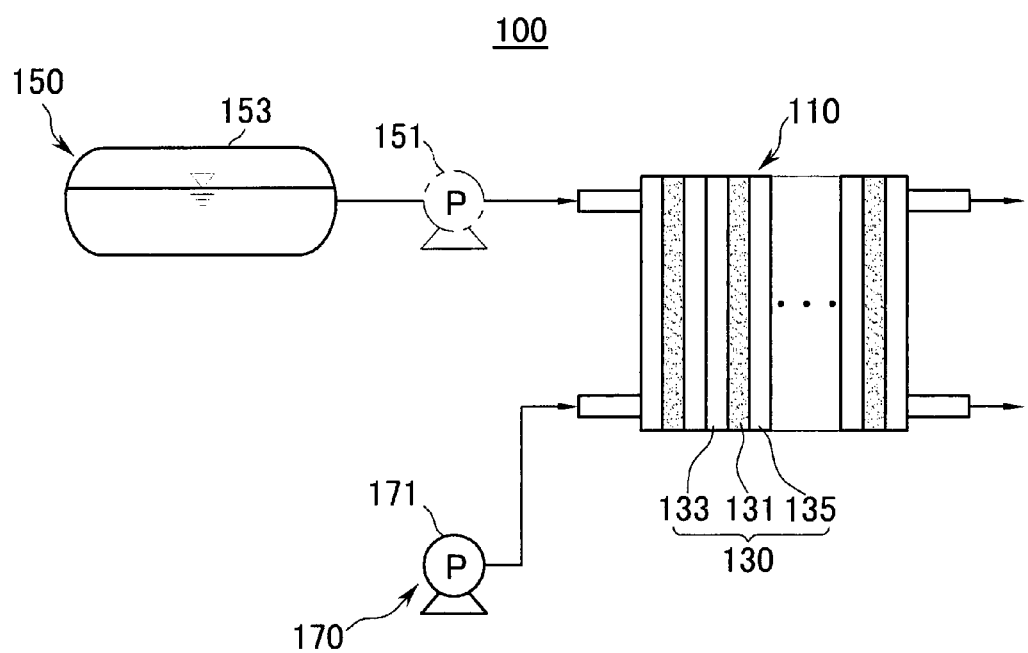
FIG. 2 is a schematic diagram showing the structure of a fuel cell system according to another embodiment of the present invention.

FIG. 2 shows a schematic structure of a fuel cell system 100 that will be described in detail with reference to this accompanying drawing, as follows. FIG. 2 illustrates a fuel cell system 100 wherein a fuel and an oxidant are provided to the electricity generating element 130 through pumps 151 and 171, but the present invention is not limited to such structures. The fuel cell system of the present invention alternatively includes a structure wherein a fuel and an oxidant are provided in a diffusion manner.

The fuel cell system 100 includes a stack 110 composed of at least one electricity generating element 130 that generates electrical energy through an electrochemical reaction of a fuel and an oxidant, a fuel supplier 150 for supplying a fuel to the electricity generating element 130, and an oxidant supplier 170 for supplying an oxidant to the electricity generating element 130.

In addition, the fuel supplier 150 is equipped with a tank 153 that stores fuel, and pump 151 that is connected therewith. The fuel pump 151 supplies fuel stored in the tank 153 with a predetermined pumping power. The oxidant supplier 170, which supplies the electricity generating element 130 of the stack 110 with an oxidant, is equipped with at least one pump 171 for supplying an oxidant with a predetermined pumping power.

The electricity generating element 130 includes a membrane-electrode assembly 131 that oxidizes hydrogen or a fuel and reduces an oxidant, and separators 133 and 135 that are respectively positioned at opposite sides of the membrane-electrode assembly 131 and that supply hydrogen or a fuel, and an oxidant, respectively.

The following examples illustrate the present invention in more detail. However, it is understood that the present invention is not limited by these examples.

Example 1

0.7 g of ruthenium carbonyl was dissolved in 150 ml of xylene. 0.5 g of $Mo_6S_{4.5}I_{4.5}$ was added to the prepared solution, and then it was stirred at 140° C. for 24 hours, filtrated, and dried at 90° C. for 7 hours to prepare a cathode catalyst for a fuel cell.

Herein, 0.6 mole of Mo, 0.45 mole of S and 0.45 mole of I was put into a quartz ampoule under vacuum and the mixture was heat treated at 250° C. for 1 week in a gradient furnace with two different heat-treatment regions of 450° C. (T1) and 430° C. (T2). As a result, $Mo_6S_{4.5}I_{4.5}$ was obtained from the T2 (430° C.) region. Further, the $Mo_6S_{4.5}I_{4.5}$ had a nanowire shape having a diameter of 20 nm and a length of 200 μtm.

Comparative Example 1

0.6 g of ruthenium carbonyl, 0.03 g of Se and 1 g of carbon were dissolved in 150 ml of toluene. The resultant was mixed at 140° C. for 24 hours. The mixed product was filtrated. The filtrated product was dried at 80° C. and then heat treated under an $H_2$-supplied condition at 250° C. for 3 hours.

An oxygen-saturated sulfuric acid solution was prepared by bubbling oxygen gas for 2 hours in a sulfuric acid solution of a 0.5M concentration. A working electrode was prepared by loading the catalyst according to Example 1 and the ruthenium black according to Comparative Example 1 on glassy carbon at $3.78 \times 10^{-3}$ mg, while a platinum mesh was employed as a counter electrode. Then, both of the electrodes were placed into the oxygen-saturated sulfuric acid solution to measure current density while changing voltage. The results are provided in the following Table 1.

TABLE 1

|  | Current density $(mA/cm^2 (0.7 V))$ |
| --- | --- |
| Example 1 | 1.44 |
| Comparative Example 1 | 0.61 |

As shown in Table 1, the catalyst according to Example 1 has better activity than the catalyst according to Comparative Example 1.

The cathode catalyst of the present invention has high activity for reduction of an oxidant and selectivity, and is capable of improving performance of a membrane-electrode assembly for a fuel cell, and a fuel cell system and a membrane-electrode assembly including the same.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A cathode catalyst, comprising:
   a carrier comprising Mo, S, and I; and
   an active metal supported on the carrier, the active metal being selected from the group consisting of Ru, Pt, Rh, and combinations thereof.

2. The cathode catalyst of claim 1, wherein the carrier is $Mo_6S_{9-x}I_x$, wherein $1 \leq x \leq 7$.

3. The cathode catalyst of claim 2, wherein $3 \leq x \leq 6$.

4. The cathode catalyst of claim 3, wherein $4.5 \leq x \leq 6$.

5. The cathode catalyst of claim 1, wherein the carrier is selected from the group consisting of nanowire, nanotubes, and a mixture thereof.

6. The cathode catalyst of claim 5, wherein the carrier is nanowire.

7. The cathode catalyst of claim 6, wherein the nanowire has a diameter ranging from 20 to 40 nm.

8. The cathode catalyst of claim 7, wherein the nanowire has a diameter ranging from 20 to 30 nm.

9. The cathode catalyst of claim 6, wherein the nanowire has a length ranging from 100 to 400 μm.

10. The cathode catalyst of claim 9, wherein the nanowire has a length ranging from 200 to 350 μm.

11. A membrane-electrode assembly, comprising:
an anode and a cathode facing each other; and
a polymer electrolyte membrane arranged between the anode and the cathode, wherein the cathode comprises
a carrier comprising Mo, S, and I, and
an active metal supported on the carrier, the active metal being selected from the group consisting of Ru, Pt, Rh, and combinations thereof.

12. The membrane-electrode assembly of claim 11, wherein the carrier is $Mo_6S_{9-x}I_x$, wherein $1 \leq x \leq 7$.

13. The membrane-electrode assembly of claim 11, wherein the carrier is selected from the group consisting of nanowire, nanotubes, and a mixture thereof.

14. The membrane-electrode assembly of claim 13, wherein the nanowire has a diameter ranging from 20 to 40 nm.

15. The membrane-electrode assembly of claim 13, wherein the nanowire has a length ranging from 100 to 400 μm.

16. The membrane-electrode assembly of claim 11, wherein the polymer electrolyte membrane comprises a polymer resin having a cation exchange group selected from the group consisting of a sulfonic acid group, a carboxylic acid group, a phosphoric acid group, a phosphonic acid group, and derivatives thereof at its side chain.

17. The membrane-electrode assembly of claim 16, wherein the polymer resin is selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, polyphenylquinoxaline-based polymers, and combinations thereof.

18. The membrane-electrode assembly of claim 11, wherein the anode comprises at least one material selected from the group consisting of platinum, ruthenium, osmium, a platinum-ruthenium alloy, a platinum-osmium alloy, a platinum-palladium alloy, a platinum-M alloy (M is a transition element selected from the group consisting of Ga, Ti, V, Cr, Mn, Fe, Co, Ni, Cu, Zn, Sn, Mo, W, Rh, Ru, and combinations thereof), and combinations thereof.

19. A fuel cell system, comprising:
a fuel supplier;
an oxidant supplier; and
at least one electricity generating element comprising a membrane-electrode assembly and separators arranged on each side of the membrane-electrode assembly, the membrane-electrode assembly comprising
a cathode,
an anode, and
a polymer electrolyte membrane arranged between the cathode and the anode, wherein the cathode comprises
a carrier comprising Mo, S, and I, and
an active metal supported on the carrier, the active metal being selected from the group consisting of Ru, Pt, Rh, and combinations thereof.

20. The fuel cell system of claim 19, wherein the carrier is $Mo_6S_{9-x}I_x$, wherein $1 \leq x \leq 7$.

21. The fuel cell system of claim 19, wherein the carrier is selected from the group consisting of nanowire, nanotubes, and a mixture thereof.

22. The fuel cell system of claim 21, wherein the nanowire has a diameter ranging from 20 to 40 nm.

23. The fuel cell system of claim 21, wherein the nanowire has a length ranging from 100 to 400 μm.

24. The fuel cell system of claim 19, wherein the polymer electrolyte membrane comprises a polymer resin having a cation exchange group selected from the group consisting of a sulfonic acid group, a carboxylic acid group, a phosphoric acid group, a phosphonic acid group, and derivatives thereof at its side chain.

25. The fuel cell system of claim 24, wherein the polymer resin is selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, polyphenylquinoxaline-based polymers, and combinations thereof.

26. The fuel cell system of claim 19, wherein the anode comprises at least one selected from the group consisting of platinum, ruthenium, osmium, a platinum-ruthenium alloy, a platinum-osmium alloy, a platinum-palladium alloy, a platinum-M alloy (M is a transition element selected from the group consisting of Ga, Ti, V, Cr, Mn, Fe, Co, Ni, Cu, Zn, Sn, Mo, W, Rh, Ru, and combinations thereof), and combinations thereof.

* * * * *